(12) United States Patent
Cociglio et al.

(10) Patent No.: US 12,003,398 B2
(45) Date of Patent: Jun. 4, 2024

(54) ROUND-TRIP PERFORMANCE MEASUREMENT IN A PACKET-SWITCHED COMMUNICATION NETWORK

(71) Applicant: TELECOM ITALIA S.p.A., Milan (IT)

(72) Inventors: Mauro Cociglio, Turin (IT); Luca Fantolino, Turin (IT); Giuseppe Fioccola, Naples (IT); Angelo Franceschini, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 8 days.

(21) Appl. No.: 16/957,610

(22) PCT Filed: Dec. 21, 2018

(86) PCT No.: PCT/EP2018/086504
§ 371 (c)(1),
(2) Date: Jun. 24, 2020

(87) PCT Pub. No.: WO2019/129688
PCT Pub. Date: Jul. 4, 2019

(65) Prior Publication Data
US 2020/0336401 A1    Oct. 22, 2020

(30) Foreign Application Priority Data
Dec. 27, 2017    (IT) .......... 102017000149565

(51) Int. Cl.
*H04L 43/0864*    (2022.01)
*H04L 12/46*    (2006.01)
(Continued)

(52) U.S. Cl.
CPC ...... *H04L 43/0864* (2013.01); *H04L 12/4633* (2013.01); *H04L 12/4641* (2013.01);
(Continued)

(58) Field of Classification Search
CPC ............ H04L 43/0864; H04L 12/4633; H04L 12/4641; H04L 43/10; H04L 43/50; H04L 45/50; H04L 47/283; H04L 43/08
See application file for complete search history.

(56) References Cited

U.S. PATENT DOCUMENTS 8,289,845 B1 * 10/2012 Baldonado .............. H04L 43/16
709/239
9,398,043 B1 * 7/2016 Yang ................... H04L 63/1441
(Continued)

FOREIGN PATENT DOCUMENTS

| EP | 1 763 172 A1 | 3/2007 |
| EP | 2 787 687 A1 | 10/2014 |
| EP | 3 232 619 A1 | 10/2017 |

OTHER PUBLICATIONS

Bonica et al. (RFC 7746) (Year: 2016).*
(Continued)

*Primary Examiner* — Abdulkader M Alriyashi
(74) *Attorney, Agent, or Firm* — Oblon, McClelland, Maier & Neustadt, L.L.P.

(57) ABSTRACT

In a method for measurement of a round-trip performance in a packet-switched communication network, a measurement device cooperating with the communication network generates a flow of test packets formatted according to the network protocol supported by the network and comprising the address of the measurement device as destination address. The test packets are then transmitted within a tunnel set up in the network and the measurement device generates one or more transmission parameters. At the end of the tunnel, the test packets are extracted therefrom and sent back to the measurement device by the forwarding function of the network protocol supported by the network. Upon receipt of the test packets, it generates one or more reception param-
(Continued)

eters, which are then combined with the transmission parameters to provide the round-trip performance measurement.

18 Claims, 7 Drawing Sheets

(51) Int. Cl.
    *H04L 43/10*         (2022.01)
    *H04L 43/50*         (2022.01)
    *H04L 45/50*         (2022.01)
    *H04L 47/283*       (2022.01)

(52) U.S. Cl.
    CPC .............. *H04L 43/10* (2013.01); *H04L 43/50* (2013.01); *H04L 45/50* (2013.01); *H04L 47/283* (2013.01)

(56) References Cited

U.S. PATENT DOCUMENTS

| | | | | |
|---|---|---|---|---|
| 2002/0116501 | A1* | 8/2002 | Ho | H04L 29/12009 |
| | | | | 709/227 |
| 2007/0058555 | A1 | 3/2007 | Blair et al. | |
| 2013/0088977 | A1* | 4/2013 | Baillargeon | H04L 12/4633 |
| | | | | 370/251 |
| 2013/0332399 | A1 | 12/2013 | Reddy et al. | |
| 2013/0332601 | A1 | 12/2013 | Nakil et al. | |
| 2013/0332602 | A1 | 12/2013 | Nakil et al. | |
| 2014/0301215 | A1 | 10/2014 | Somoskői et al. | |
| 2016/0301954 | A1* | 10/2016 | Oh | H04N 21/6125 |
| 2017/0093670 | A1* | 3/2017 | Dinan | H04L 67/1004 |
| 2018/0337833 | A1* | 11/2018 | Attarwala | H04L 43/10 |
| 2018/0351787 | A1* | 12/2018 | Boyapati | H04L 41/0672 |

OTHER PUBLICATIONS

International Search Report dated Jan. 22, 2019 in PCT/EP2018/086504, 3 pages.
D. Farinacci et al. "Generic Routing Encapsulation (GRE)", Network Working Group, Request for Comments: 2784, Category: Standards Track, Mar. 2020, pp. 1-9.
S. Bryant, Ed. et al., "Pseudo Wire Emulation Edge-to-Edge (PWE3) Architecture", Network Working Group, Request for Comments: 3985, Category: Informational, Mar. 2005, pp. 1-42.
E. Rosen et al., "BGP/MPLS IP Virtual Private Networks (VPNs)", Network Working Group, Request for Comments: 4364, Obsoletes: 2547, Category: Standards Track, Feb. 2006, pp. 1-47.

\* cited by examiner

ROUND-TRIP PERFORMANCE MEASUREMENT IN A PACKET-SWITCHED COMMUNICATION NETWORK

TECHNICAL FIELD

The present invention relates to the field of communication networks. In particular, the present invention relates to a method and device for performing a round-trip performance measurement in a packet-switched communication network.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Packets not always reach their destination nodes, i.e. they may be lost during transmission through the network. Packet loss is due to different reasons. For instance, a node or link may fail, or packets may be discarded by a node due to a congestion of its ports. Besides, packets may be discarded by a node since they contain bit errors.

Moreover, each packet is transmitted at a transmission time by the source node and is received at a reception time by the destination node. The time elapsing between transmission time and reception time is typically called "one-way delay". The one-way delay of a packet mainly depends on the number of possible intermediate nodes crossed by the packet from source to destination, the permanence time of the packet at each node and the propagation time along the links.

Furthermore, packets may have different one-way delays. The difference between the one-way delays of two packets of a same packet flow is termed "interarrival jitter" (or, briefly, "jitter").

When a communication service (in particular, a real-time voice or data service such as call, conference call, video conference, etc.) is provided by means of a packet-switched network, a performance measurement in terms of packet loss, one-way delay and/or jitter on packet flows carrying the service provides an indication of the quality of service (QoS) perceived by the end users of the service. In addition, packet loss and high delay/jitter may require retransmission and then reduce the efficiency of the communication network. Therefore, measuring packet loss, one-way delay and/or jitter of packet flows in a communication network is of particular interest for network operators.

Several techniques are known which provide round-trip or two-way measurements, instead of one-way measurements. Such techniques are helpful especially because they do not require mutual synchronization of the local clocks at the various network nodes.

For instance, Ping is a known technique for measuring the round-trip delay between two nodes of an IP network. Ping in particular provides for sending a flow of ICMP (Internet Control Message Protocol) Echo Request packets from a first node acting as echo sender to a second node acting as echoer. Upon reception of each ICMP Echo Request packet, the echoer sends back to the echo sender a corresponding ICMP Echo Reply packet. A round-trip delay is then calculated for each Echo Request-Echo Reply couple, as a difference between reception time of the Echo Reply and transmission time of the Echo Request.

TWAMP (Two-Way Active Measurement Protocol) is also known, which provides two-way delay measurements between two nodes of an IP network. TWAMP in particular provides for sending a flow of sender test packets from a sender node to a reflector node. Upon reception of each sender test packet from the sender node, the reflector node sends back a corresponding reflector test packet including both the reception time of the sender test packet and the transmission time of the reflector test packet. Two-way delay measurements may therefore be calculated based on transmission and reception times of each sender test packet and transmission and reception times of each reflector test packet.

SUMMARY OF THE INVENTION

The Applicant has perceived that the above known techniques for providing round-trip or two-way measurements exhibit some drawbacks.

First of all, both Ping and TWAMP require a quite complex processing at the echoer or reflector node, especially TWAMP where timestamps shall be generated by the reflector. Such processing is rarely implemented in optimized way thereby requiring a non negligible computational effort at the echoer or reflector node. This disadvantageously limits the maximum packet rate that may be used for the flow of test packets and therefore prevents these known techniques from being practically applicable in situations wherein the packet rate of the test packet flow shall be particularly high, e.g. when capacity measurements shall be made.

Besides, the round-trip delay provided by Ping also comprises the processing time at the echoer. Such processing time may be a non negligible component of the round-trip delay and is unpredictable. Even worse, the processing time at the echoer may exhibit significant peaks due to the fact that the Echo Request-Echo Reply packets are special packets (namely, ICMP packets) which, differently from IP packets carrying user data, may undergo a non-real time processing by the node acting as echoer. As a result, the round-trip delay results provided by Ping are not reliable/accurate and are often not indicative of the real behaviour of the network, especially as far as maximum delay and maximum jitter are concerned.

Also TWAMP may suffer from inaccuracy issues. The accuracy of the provided two-way measurements indeed depends on the accuracy of the timestamps generated at the reflector node. Accurate timestamps may however be provided only if an accurate hardware implementation of the test packet processing is deployed at the reflector node. Such hardware implementation is however very critical and, sometimes, even not feasible at all, e.g. if the reflector node is not within the domain of the network operator managing the performance measurement.

In view of the above, the Applicant has tackled the problem of providing a method and device for performing a round-trip performance measurement in a packet-switched communication network, which overcomes the aforesaid drawbacks.

In particular, the Applicant has tackled the problem of providing a method and device for performing a round-trip performance measurement in a packet-switched communication network, which is practically applicable in situations wherein the packet rate of the test packet flow shall be particularly high (e.g. when capacity measurements shall be made) and which provides reliable and accurate results.

In the following description and in the claims, the expression "performing a round-trip performance measurement in a packet-switched communication network" will designate an operation of measuring a round trip packet loss, a round-trip delay or a round-trip jitter undergone by a flow of test packets transmitted back and forth between a measurement device and a node (also termed herein after "target node") of the packet-switched communication network.

According to embodiments of the present invention, the above problem is solved by providing the packet-switched communication network with a measurement device which generates a flow of test packets formatted according to the network protocol supported by the network and having in their headers packet forwarding information suitable for inducing the network to forward the test packets to the measurement device itself. The test packets are transmitted from the measurement device within a tunnel set up in the network. At the end of the tunnel, the test packets are extracted therefrom and are then forwarded back to the measurement device (MD) based on the packet forwarding information comprised in their headers. While the test packets are transmitted from the measurement device, the measurement device generates transmission parameter(s) and, while the test packets as extracted from the tunnel are received at the measurement device, it also generates reception parameter(s). The measurement device then performs round-trip performance measurement based on the transmission parameter(s) and reception parameter(s).

This device and method for performing a round-trip performance measurement according to the present invention have several advantages.

First of all, the processing of the test packets at the target node basically consists in (i) if the tunnel is terminated at the target node, terminating the tunnel carrying the test packets and (ii) forwarding the test packets back to the measurement device according to the packet forwarding information comprised in their headers. Every node of a packet-switched communication network is however inherently provided with the forwarding function according to the network protocol supported by the network (e.g. IP). Besides, the nodes of a packet-switched communication network usually also support one or more tunnelling techniques (e.g. GRE, PWE3 or MPLS) and, if they don't, a tunnelling function is anyway easily implementable at the hardware level. Hence, the processing of the test packets at the target node may advantageously be implemented at the hardware level, at least partially by exploiting the hardware features already available at the nodes of the network.

On one hand, the hardware implementation of the processing of the test packets at the target node enables the method to operate at packet rates much higher than Ping or TWAMP, thereby providing very accurate and reliable results and making the method practically applicable in situations wherein the packet rate of the test packet flow shall be particularly high.

The measurement results are moreover highly indicative of the real behaviour of the network. The test packets, indeed, are not special packets (like e.g. ICMP packets used by Ping), but are instead "normal" packets formatted according to the network protocol supported by the network. The target node will accordingly process them in real-time, like any other received packet.

Moreover, exploitation of hardware features already available at the target node is advantageous in that (i) it allows implementing the method without requiring the target node to support any special protocol or technique and (ii) it allows to deploy the measurement even if the target node is located outside the domain of the network operator managing the performance measurements.

According to a first aspect, the present invention provides a method for performing a round-trip performance measurement in a packet-switched communication network supporting a network protocol, the method comprising:

a) at a measurement device cooperating with the communication network, generating a flow of test packets formatted according to the network protocol and comprising packet forwarding information suitable for inducing the communication network to forward the test packets to the measurement device;

b) transmitting the test packets from the measurement device within a tunnel set up in the communication network and, while the test packets are transmitted, generating at least one transmission parameter;

c) after the test packets have been extracted from the tunnel, forwarding back the test packets to the measurement device based on the packet forwarding information and, while the test packets as extracted from the tunnel are received at the measurement device, generating at least one reception parameter; and d) performing the round-trip performance measurement based on the at least one transmission parameter and the at least one reception parameter.

Preferably, the packet forwarding information is comprised in a header of each test packet.

According to an embodiment, the packet forwarding information comprises an address of the measurement device, the address being written by the measurement device in a destination address field of the header of each generated test packet.

Preferably, step b) comprises:
at the ingress of the tunnel, inserting each test packet in the tunnel by prefixing a tunnel header thereto; and
at the exit of the tunnel, extracting each test packet from the tunnel by removing the tunnel header therefrom.

Preferably, the network protocol is IP (Internet Protocol) and the tunnel is implemented:
by means of generic routing encapsulation protocol; or
by means of multiprotocol label switching; or
as a virtual private network.

According to an embodiment, at step b) the tunnel is originated at the measurement device.

According to another embodiment, step b) comprises transmitting the test packets from the measurement device to a first node of the packet-switched communication network, the first node being adjacent to the measurement device, the tunnel being originated at the first node.

According to this embodiment, preferably, step b) comprises, at the first node, identifying the test packets from the measurement device and inserting the test packets within the tunnel, the test packets being identified based on one or more of the following information:
identifier of logical ingress or logical interface through which the test packets are received at the first node;
destination address of the test packets; and
destination port of the test packets.

According to an embodiment, at step b) the tunnel is terminated at a target node of the communication network, the target node extracting the test packets from the tunnel (T).

According to another embodiment, at step b) the tunnel is terminated at a second node of the communication network, the second node extracting the test packets from the tunnel and, based on a rule overruling default forwarding criteria of the second node, forcing transmission of the test packets to a target node of the communication network, the target node being adjacent to the second node.

In any case, preferably, at step b) the target node forwards the test packets back to the measurement device based on the packet forwarding information comprised in the test packets, by using a forwarding engine and forwarding table comprised in the target node.

According to an embodiment, step b) comprises locally storing at the measurement device the at least one transmission parameter.

According to another embodiment:
step b) comprises inserting values of the at least one transmission parameter in the test packets, before they are transmitted within the tunnel; and
step c) comprises extracting the values of the at least one transmission parameter from the test packets extracted from the tunnel and received at the measurement device.

Preferably:
at step b), the at least one transmission parameter comprises a transmission counter counting a number of test packets transmitted by the measurement device and/or, for each transmitted test packet, a respective transmission timestamp indicating a time at which the test packet has been transmitted by the measurement device; and
at step c), the at least one reception parameter comprises a reception counter counting a number of test packets received by the measurement device and/or, for each received test packet, a respective reception timestamp indicating a time at which the test packet has been received by the measurement device.

According to an embodiment, the measurement device is a measurement function embedded within a node of the communication network.

According to a second aspect, the present invention provides a measurement device for performing a round-trip performance measurement in a packet-switched communication network supporting a network protocol, the measurement device comprising:
a test packet generator configured to generate a flow of test packets formatted according to the network protocol and comprising packet forwarding information suitable for inducing the communication network to forward the test packets to the measurement device;
a packet encapsulator configured to transmit the test packets from the measurement device within a tunnel set up in the communication network; and
a measurement point (MP) configured to:
while the test packets are transmitted from the measurement device within the tunnel, generating at least one transmission parameter;
while the test packets as extracted from the tunnel and forwarded back to the measurement device based on the packet forwarding information are received at the measurement device, generating at least one reception parameter; and
performing the round-trip performance measurement based on the at least one transmission parameter and the at least one reception parameter.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
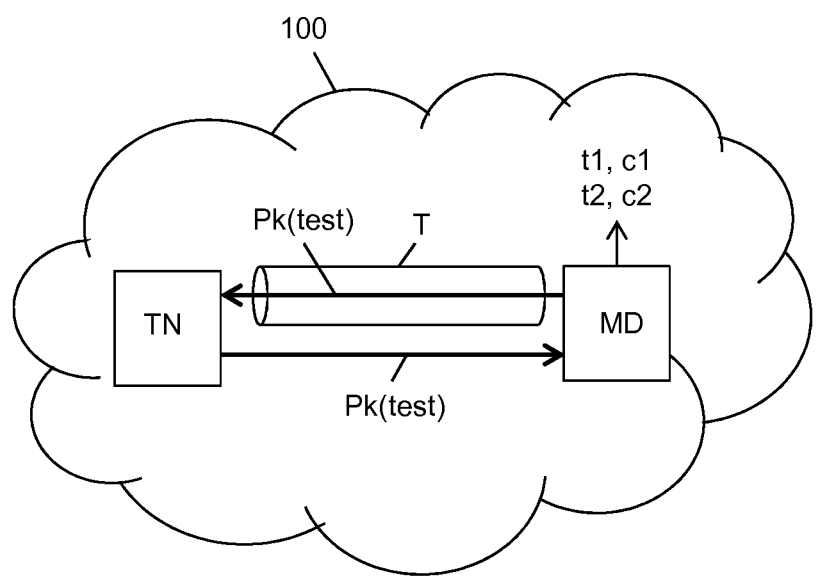
FIG. 1 schematically shows a packet-switched communication network comprising a device for performing a round-trip performance measurement, according to a first embodiment of the present invention.

FIG. 1 schematically shows a packet-switched communication network 100 comprising a device for performing round-trip performance measurements, according to a first embodiment of the present invention.

The communication network 100 comprises a plurality of nodes reciprocally interconnected by physical links according to any known topology, including a node TN shown in FIG. 1.

Figure 2A:
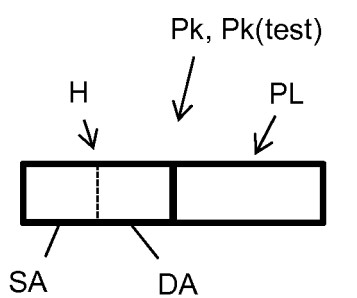
FIGS. 2a and 2b show the structure of a test packet and the structure of an encapsulated test packet, respectively

The packet-switched communication network 100 is preferably configured to support transmission of packets Pk according to a certain network protocol, such as for instance IP (Internet Protocol) (e.g. IPv4 or IPv6). As schematically depicted in FIG. 2a, each packet Pk comprises a payload PL and a header H.

The payload PL comprises user data.

The header H of each packet Pk is formatted according to the network protocol supported by the network 100 and comprises packet forwarding information, namely information allowing the nodes of the network 100 to properly handle the packets Pk so that they reach their destination nodes. The header H in particular comprises packet forwarding information suitable for inducing the network to forward the packet Pk towards its destination. For example, in case the network 100 is configured to support IP as network protocol, the header H comprises a source address field SA comprising the IP address of the source node of the packet Pk and a destination address field DA comprising the IP address of the destination node of the packet Pk.

Optionally, the packet Pk may also comprise a sequence number (not shown in FIG. 2a) allowing to recover the proper sequence of packets Pk at the reception side.

The header H may comprise other fields, which depend on the network protocol supported by the network 100 and which will be not described in detail herein after, since they are not relevant to the present description.

The network 100 is also provided with a measurement device MD. The measurement device MD is connected to the node TN, also termed herein after "target node", by a link, e.g. an optical link. The link may be direct (namely, the measurement device MD and the target node TN may be adjacent) or may comprise a concatenation of several physical links and network nodes (namely, intermediate nodes not shown in FIG. 1 are located between the measurement device MD and the target node TN).

Figure 3:
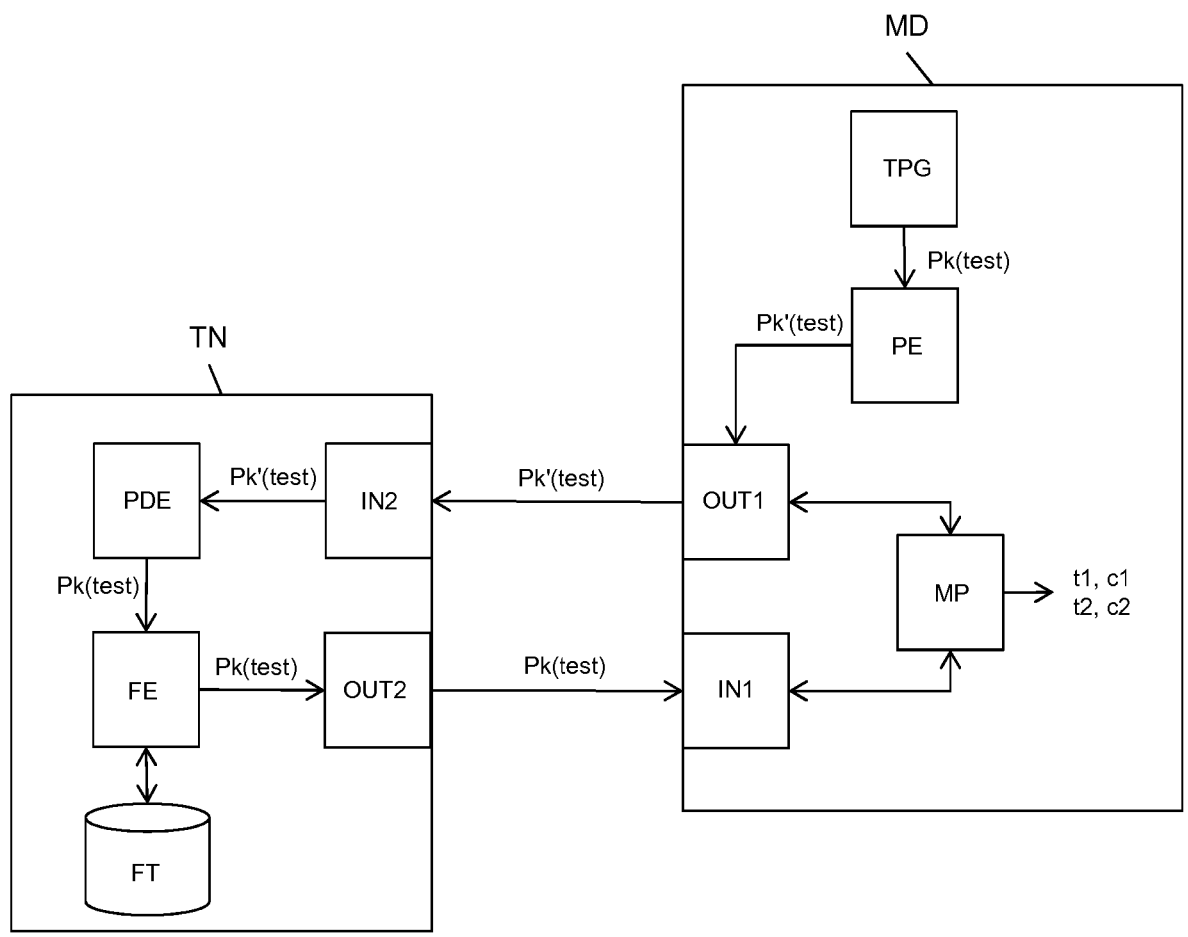
FIG. 3 shows in further detail the structure of the measurement device and the target node of FIG. 1.

As shown in FIG. 3, the measurement device MD preferably comprises a plurality of input interfaces and output interfaces. In FIG. 3, for simplicity a single input interface IN1 and a single output interface OUT1 are shown.

Preferably, the measurement device MD also preferably comprises a test packet generator TPG that, as it will be described in detail herein after, is suitable for generating a flow of test packets Pk(test) formatted according to the network protocol supported by the packet-switched communication network 100.

The measurement device MD also preferably comprises a packet encapsulator PE. As it will be described in detail herein after, the packet encapsulator PE is configured to encapsulate each test packet Pk(test) received from the test packet generator TPG into a corresponding encapsulated test packet Pk'(test) by prefixing thereto a tunnel header and to forward it to the output interface OUT1.

The measurement device MD also preferably comprises a measurement point MP connected to the input interface IN1 and output interface OUT1. As it will be described in detail herein after, the measurement point MP is configured to generate at least one transmission parameter relating to the encapsulated test packets Pk'(test) as transmitted by the output interface OUT1 and at least one reception parameter relating to the test packets Pk(test) as received by the input interface IN1.

Also the target node TN comprises a plurality of input interfaces and output interfaces. In FIG. 3, for simplicity a single input interface IN2 and a single output interface OUT2 are shown.

Preferably, the target node TN also comprises a packet de-encapsulator PDE that, as it will be described in detail herein after, is configured to extract each test packet Pk(test) from the corresponding encapsulated test packet Pk'(test) received from the input interface IN2 by removing the above mentioned tunnel header therefrom.

Since the network 100 is configured to support a certain network protocol, the target node TN is inherently configured to support the packet forwarding functionality of that network protocol, by which the target node TN is capable of properly forwarding each received packet Pk based on the packet forwarding information comprised in its header H, for example—in case of IP network—in its destination address field DA. In particular, the target node TN preferably comprises a forwarding engine FE and a forwarding table FT. The forwarding table FT stores associations between destination addresses of packets Pk and output interfaces of the node N2. The forwarding engine FE is instead configured to forward every packet Pk received at the target node TN—including the test packets Pk(test) received from the packet de-encapsulator PDE—towards the proper output interface of the target node TN, as determined from the forwarding table FT based on the packet forwarding information (e.g. the packet's destination address DA, in case the network 100 support IP as network protocol).

As schematically depicted in FIG. 3, the output interface OUT1 of the measurement device MD is connected to the input interface IN2 of the target node TN, while the output interface OUT2 of the target node TN is connected to the input interface IN1 of the measurement device MD. If the measurement device MD and the target node TN are adjacent, the connection OUT1-IN2 and the connection OUT2-IN1 are single-hop connections. Otherwise, if intermediate nodes not shown in FIG. 3 are located between MD and TN, such connections are multi-hops connections.

Figure 4:
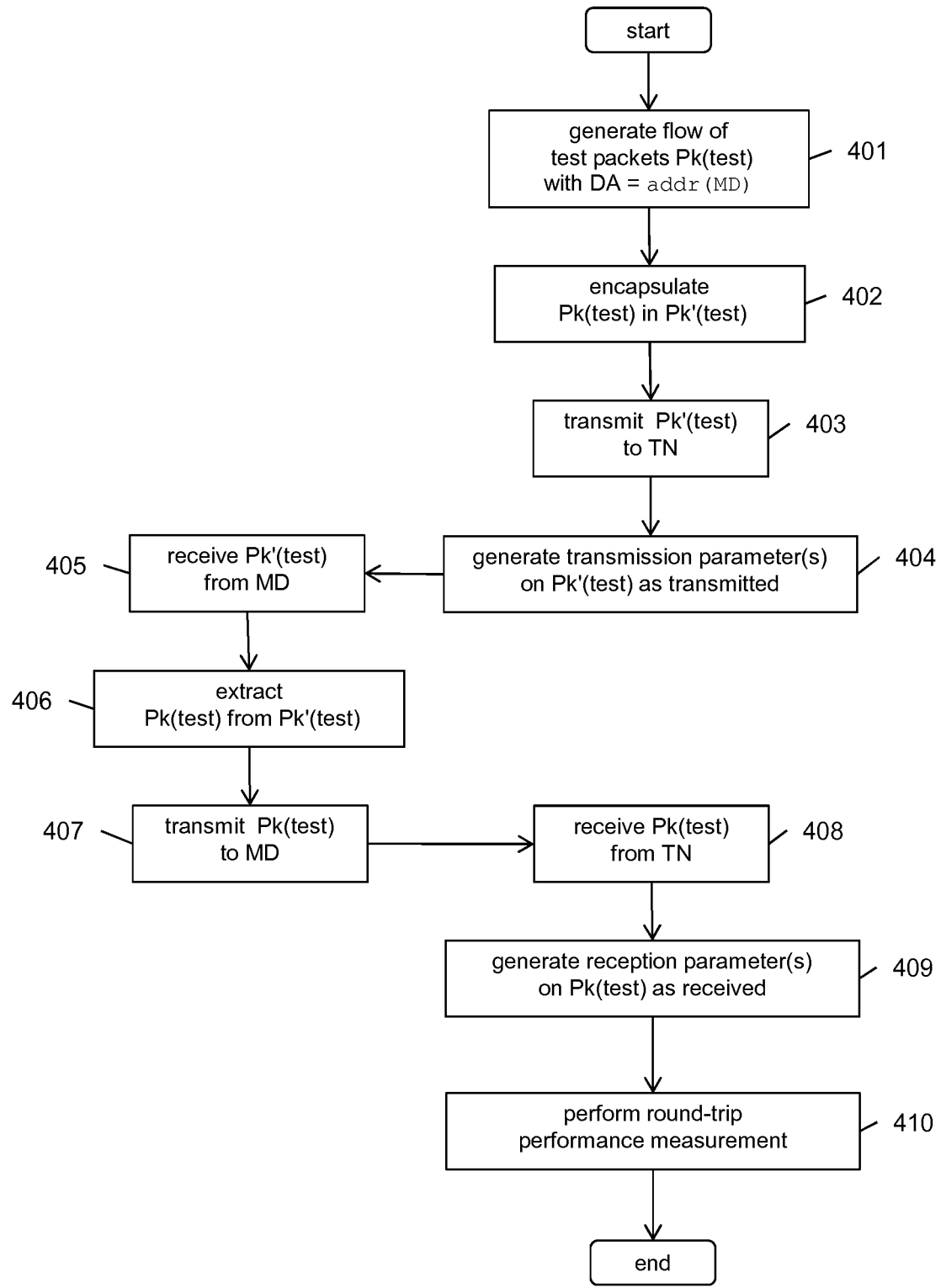
FIG. 4 is a flow chart of the method for performing a round-trip performance measurement; according to the first embodiment of the present invention

With reference now to the flow chart of FIG. 4, in order to start a round-trip performance measurement session, at the measurement device MD the test packet generator TPG preferably starts generating a flow of test packets Pk(test) (step 401). The test packets Pk(test) are formatted according to the network protocol supported by the network 100. Hence, their structure is similar to that shown in FIG. 2a and described above.

In particular, the payload PL of each test packet Pk(test) may comprise for instance a test packet identifier (such as a test packet sequence number) and/or a transmission timestamp of the test packet and/or information identifying the measurement session and/or padding bits allowing to reach a desired test packet size.

Further, in the header H of each test packet Pk(test), the packet forwarding information comprised therein are such that they cause the test packet to be forwarded to the measurement device MD itself. For example, in case the network 100 supports IP as network protocol, the header H of each test packet Pk(test) comprises in its destination address field DA the IP address addr(MD) of the measurement device MD.

The test packets Pk(test) are preferably generated at a rate depending on the desired measurement resolution and precision, the traffic load to be achieved and according to constraints on the resources and network capacity. Herein below, some examples are provided on how the test packet rate may be selected:

for a measurement of delay statistics (minimum delay, maximum delay, average delay, $95^{th}$ percentile, etc.), the test packet rate is preferably such that, in the time window provided for the measurement, at least 40 to 100 test packets are received. For instance, if the time window is 10 seconds, the test packet rate preferably is between 4 to 10 pkt/s (assuming zero packet loss).

for a measurement aiming at verifying that the packet loss is below a given threshold, the packet rate is preferably 2 to 5 times the reciprocal of the product between the time window of measurement (resolution) and the packet loss threshold. If the packet loss threshold is 0.0001 and the time window is 5 minutes, then the test packet rate is preferably between 66.7 pkt/s and 166.7 pkt/s.

for a measurement of the actual bandwidth, the test packet rate preferably is the ratio between the nominal bandwidth and the packet length (in bits). If the nominal bandwidth is 100 Mbit/s and the test packet length is 12,000 bits, then the test packet rate preferably is 8,333 pkt/s.

Figure 2B:
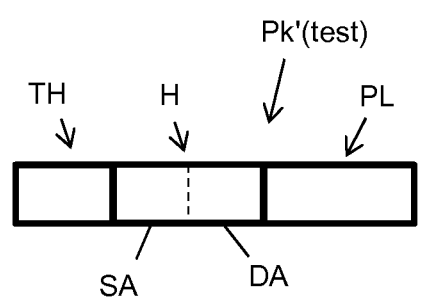

Then, according to the first embodiment, the packet encapsulator PE of the measurement device MD preferably encapsulates the test packets Pk(test) in corresponding encapsulated test packets Pk'(test) (step 402) by prefixing to each test packet Pk(test) a respective tunnel header TH, as schematically depicted in FIG. 2b.

The tunnel header TH is preferably configured so as to implement a tunnel T that, according to the first embodiment, is originated at the measurement device MD itself and is terminated at the target node TN. Through the tunnel T, by definition of "tunnel", the test packets Pk(test) are transmitted in such a way that any possible intermediate node comprised between MD and TN is unaware of what is being transmitted in the tunnel T. In other words, as long as the test packets Pk(test) are within the tunnel T, their content—and in particular their packet forwarding information, e.g. their destination address addr(MD) in case of IP as network protocol—are hidden to the possible intermediate nodes between MD and TN. The intermediate nodes therefore limit themselves to process the outermost header of the encapsulated packets Pk'(test), namely the tunnel header TH.

The tunnel header TH may be compliant with any tunnelling or encapsulation protocol compatible with the network protocol supported by the communication network 100.

Figure 5A:
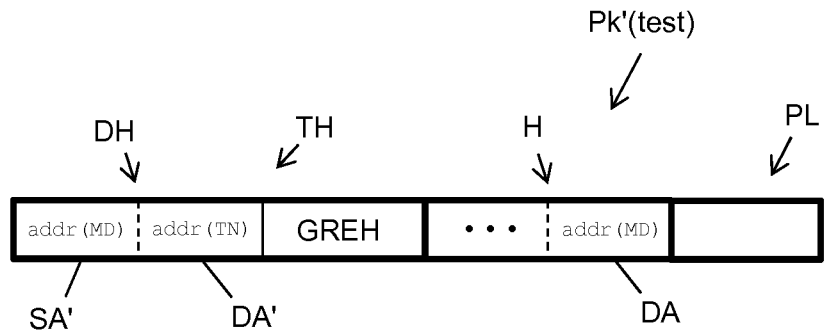
FIGS. 5a, 5b and 5c show in further detail the structure of an encapsulated test packet, according to three different variants of the present invention.

For instance, if the network 100 is an IP network (namely, the test packets Pk(test) are IP packets), the tunnel T may be implemented by using the known GRE (Generic Routing Encapsulation) tunnelling protocol described in RFC 2784 of March 2000. In such case, the packet encapsulator PE preferably prefixes to each IP test packet Pk(test) a tunnel header TH comprising a GRE header GREH and a delivery header DH external to the GRE header GREH, as schematically depicted in FIG. 5a. Similarly to the header H, also the delivery header DH is an IP header. However, in the IP delivery header DH the source address field SA' comprises the address addr(MD) of the measurement device MD and the destination address field DA' comprises the address addr(TN) of the target node TN. The encapsulated test packets Pk'(test) are therefore advantageously routed by exploiting the same forwarding functionality (namely, IP routing) supported by the nodes of the network 100 for forwarding the packets Pk, with no need to implement any additional packet forwarding mechanism.

Figure 5B:
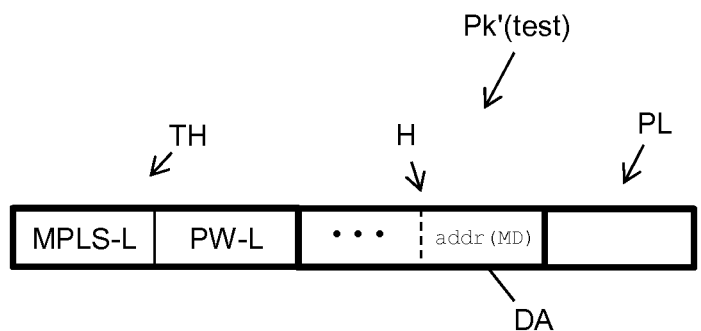

As another example, if the network 100 is an IP/MPLS network (namely, the test packets Pk(test) are IP packets), the tunnel T may be implemented by using the known MPLS (Multi Protocol Label Switching) technique with PWE3 (Pseudo-Wire Emulation Edge-to-Edge) over MPLS as described by the RFC 3985 of March 2005, par. 5.4.2. In such case, the packet encapsulator PE preferably prefixes to each IP test packet Pk(test) a tunnel header TH comprising a pseudo-wire label PW-L and an MPLS label MPLS-L external to the pseudo-wire label PW-L, as schematically depicted in FIG. 5b. As known, the pseudo-wire label PW-L uniquely identifies the wire (namely, the tunnel T) from MD to TN, while the label MPLS-L comprises a value which allows each intermediate node between MD and TN to implement a label switching function to properly route the encapsulated test packets Pk'(test) from MD to TN. This second exemplary implementation is advantageous in that the overhead due to the tunnel header TH is particularly reduced, the concatenation of an MPLS label and pseudo-wire label being shorter than the concatenation of an IP delivery header and a GRE header.

By referring again to the flow chart of FIG. 4, the encapsulated test packets Pk'(test) are then transmitted from the measurement device MD to the target node TN (step 403). In particular, the packet encapsulator PE of the measurement device MD preferably forwards the encapsulated packets Pk'(test) to the output interface OUT1, which transmits them towards the target node TN. The encapsulated test packets Pk'(test) are forwarded from MD to TN based on the information comprised in their tunnel header TH, according to the tunnelling technique used to implement the tunnel T.

According to the first embodiment, while the encapsulated test packets Pk'(test) are transmitted by the measurement device MD, the measurement point MP preferably generates at least one transmission parameter relating to the encapsulated test packets Pk'(test) as transmitted by the output interface OUT1 (step 404).

For instance, the measurement point MP may provide one or more of the following performance parameters:

a transmission counter $c_1$ which is increased by one upon transmission of each encapsulated test packet Pk'(test) from the output interface OUT1, and whose value accordingly is the number of encapsulated test packets Pk'(test) which has been transmitted since the beginning of the performance measurement session; and
  a transmission timestamp MO generated upon transmission of the $i^{th}$ encapsulated test packet Pk'(test) (i being the transmitted packet index) and indicating the time at which the $i^{th}$ encapsulated test packet Pk'(test) has been transmitted.

Preferably, the values of the transmission counter $c_1$ and the transmission timestamps MO are locally stored by the measurement device MD in a local memory (not shown in the drawings).

If reception sequence errors and/or undetected packet losses are negligible, the transmission timestamps MO may be stored as an ordered sequence of timestamps, the order of the timestamps being the same as the order of transmission of the encapsulated test packets.

If, instead, reception sequence errors and/or undetected packet losses may occur, each transmission timestamp MO is preferably stored together with an identifier ID(i) of the corresponding $i^{th}$ encapsulated test packet Pk'(test). Such identifier ID(i), for instance, may be the above mentioned sequence number optionally comprised in the test packets Pk(test).

Alternatively, reception sequence errors may be managed by generating the transmission timestamp MO for each encapsulated test packet Pk'(test) immediately before the encapsulation step 402 and inserting the value of the transmission timestamp MO in the corresponding test packet Pk(test), before the tunnel header TH is prefixed thereto. This way, only the value of the transmission counter $c_1$, which is continuously updated while the encapsulated test packets Pk'(test) are transmitted, has to be locally stored by the measurement device MD.

The encapsulated test packets Pk'(test) are then received at the target node TN (step 405), in particular at the input interface IN2 of the target node TN.

Based on the information comprised in the tunnel header TH, the target node TN realizes that the tunnel T shall be terminated, namely that the test packets Pk(test) shall be extracted from the tunnel T. For this purpose, the packet de-encapsulator PDE of the target node TN preferably extracts each test packet Pk(test) from the respective encapsulated test packet Pk'(test) by removing the tunnel header TH therefrom (step 406).

The target node TN then normally processes the test packets Pk(test) based on the packet forwarding information comprised in their header H—e.g. based on the value of their destination address field DA, in case of IP as network protocol supported by the network 100—according to the forwarding functionality of the network protocol supported by the packet-switched network 100 (step 407). In case of IP, for instance, since the value of destination address field DA in the header H of the test packets is the address of the measurement device addr(MD), the test packets Pk(test) are accordingly sent back to the measurement device MD.

In particular, always with reference to the exemplary scenario of IP as network protocol, in the forwarding table FT at the target node TN, the destination address addr(MD) of the test packets Pk(test) is associated with the output interface OUT2, so that the forwarding engine FE of the target node TN transmits the test packets Pk(test) through the output interface OUT2.

The test packets Pk(test) are then received at the measurement device MD (step 408), in particular at the input interface IN1. In case the connection OUT2-IN1 is a single-hop connection, the test packets Pk(test) are received directly from the output interface OUT2. If instead the connection OUT2-IN1 is a multi-hop connection, the test packets Pk(test) are received at the input interface IN1 through the intermediate nodes. In such case, the forwarding table of each intermediate shall includes forwarding information to forward the test packets with that destination address DA equal to addr(MD) towards the measurement device MD. As an example, this forwarding information can be learned via routing protocols normally applied to the production traffic.

While the test packets Pk(test) are received at the measurement device MD, the measurement point MP preferably generates at least one reception parameter relating to the test packets Pk(test) as received by the input interface IN1 (step 409).

For instance, the measurement point MP may provide one or more of the following performance parameters:
- a reception counter $c_2$ which is increased by one upon reception of each test packet Pk(test) at the input interface IN1, and whose value accordingly is the number of test packets Pk(test) which has been received since the beginning of the performance measurement session; and
- a reception timestamp $t_2(j)$ generated upon reception of the $j^{th}$ test packet Pk(test) (j being the received packet index) and indicating the time at which the $j^{th}$ test packet Pk(test) has been received.

Preferably, the values of the transmission counter $c_1$ and the reception timestamps $t_2(j)$ are locally stored by the measurement device MD in the above mentioned local memory.

If the transmission timestamps MO are stored as an ordered sequence of timestamps without packet identifiers, the reception timestamps $t_2(j)$ are also preferably stored as an ordered sequence of timestamps, the order of the timestamps being the same as the order of reception of the test packets.

If, instead, each transmission timestamp $t_1(i)$ is stored together with an identifier ID(i) of the corresponding $i^{th}$ transmitted encapsulated test packet Pk'(test), each reception timestamp $t_2(j)$ is also preferably stored together with an identifier ID(j) of the corresponding $j^{th}$ received test packet Pk(test). Such identifier ID(j), for instance, may be the above mentioned sequence number optionally comprised in the header H of the test packets Pk(test).

If, instead, each transmission timestamp MO has been inserted before the encapsulation step 402 in the corresponding test packet Pk(test), upon reception of each test packet Pk(test) the measurement point MP generates the respective reception timestamp $t_2(j)$ with j=i, reads from the test packet Pk(test) the transmission timestamp MO and stores both of them.

The measurement point MP then preferably performs round-trip performance measurements (step 410) based on the at least one transmission parameter relating to the encapsulated test packets Pk'(test) as transmitted by the output interface OUT1 and the at least one reception parameter relating to the test packets Pk(test) as received by the input interface IN1.

For instance, the measurement point MP may perform one or more of the following round-trip measurements:
round-trip packet loss measurement calculated as:

$$PL = C_1 - C_2 \quad [1]$$

where $C_1$ is the value of the transmission counter $c_1$ at the end of the measurement session and $C_2$ is the value of the reception counter $c_2$ at the end of the measurement session;

round-trip delay measurement for each test packet Pk, calculated as:

$$D(k) = t_2(k) - t_1(k) \quad [2]$$

wherein k is an index ranging from 1 to $C_2$, $t_2(k)$ is the reception timestamp for the $k^{th}$ received test packet Pk(test) and $t_1(k)$ is the transmission timestamp for the encapsulated test packet Pk'(test) in which the $k^{th}$ test packet Pk(test) was encapsulated;

round-trip jitter measurement for each pair of consecutive test packets calculated as:

$$J(k) = D(k) - D(k-1) \quad [3]$$

bandwidth measurement calculated as:

$$B = \frac{\sum_{k=1}^{C_2} L(k)}{t_2(C_2) - t_2(1)} \quad [4]$$

wherein L(k) is the size (in bits) of the $k^{th}$ received test packet Pk(test), $t_2(1)$ is the reception timestamp of the first received test packet and $t_2(C_2)$ is the reception timestamp of the last received test packet.

In addition, optionally, based on the results provided for each test packet by equations [2] and [3] above, cumulative statistical measurements may be calculated (maximum, minimum, average, variance, etc.).

The above described method for performing a round-trip performance measurement has several advantages.

First of all, the processing of the test packets Pk(test) at the target node TN basically consists in (i) according to the first embodiment, terminating the tunnel T carrying the test packets Pk(test) by means of the packet-de-encapsulator PDE and (ii) forwarding the test packets Pk(test) according to packet forwarding information comprised in their headers (e.g. their destination address addr(MD), in case of IP) by means of the forwarding table FT and forwarding engine FE. Every node of the packet-switched communication network 100 (including the target node TN) is however inherently provided with the forwarding function according to the network protocol supported by the network 100 (e.g. IP). Besides, the nodes of a packet-switched communication network usually also support one or more tunnelling techniques (e.g. GRE, PWE3 or MPLS) and, if they don't, a tunnelling function is anyway easily implementable at the hardware level. Hence, the processing of the test packets Pk(test) at the target node TN may advantageously be implemented at the hardware level, at least partially by exploiting the hardware features already available at the node TN.

On one hand, the hardware implementation of the processing of the test packets Pk(test) at the target node TN enables the method to operate at packet rates much higher than Ping or TWAMP, thereby providing very accurate and reliable results and making the method practically applicable in situations wherein the packet rate of the test packet flow Pk(test) shall be particularly high.

The measurement results are moreover highly indicative of the real behaviour of the network 100. The test packets Pk(test), indeed, are not special packets (like e.g. ICMP packets used by Ping), but are instead "normal" packets formatted, according to the network protocol supported by the network 100, as also shown in FIG. 2a. The target node TN will accordingly process them in real-time, like any other received packet Pk.

Moreover, exploitation of hardware features already available at the target node TN is advantageous in that (i) it allows implementing the method without requiring the target node TN to support any special protocol or technique and (ii) it allows to deploy the method even if the target node TN is located outside the domain of the network operator managing the performance measurements.

Figure 6:
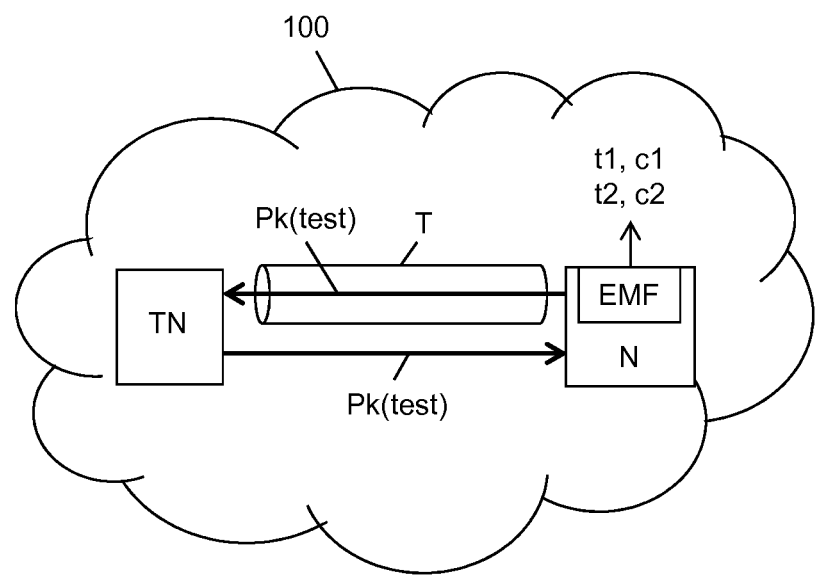
FIG. 6 schematically shows a packet-switched communication network comprising a device for performing a round-trip performance measurement, according to a second embodiment of the present invention.

According to a second embodiments of the present invention, the functionalities of the measurement device MD are embedded within a node of the communication network 100, as schematically depicted in FIG. 6.

As shown in FIG. 6, a node N of the network 100 comprises an embedded measurement function EMF and is connected to a target node TN of the network 100. This way, the embedded measurement function EMF within the node N provides round-trip performance measurements between the nodes N and TN. The embedded measurement function EMF is preferably implemented via software within the node N.

Both the measurement device MD according to the first embodiment of the present invention and the embedded measurement function EMF according to the second embodiment of the present invention are advantageously applicable to point-to-multipoint or multipoint-to-multipoint scenarios.

Figure 7:
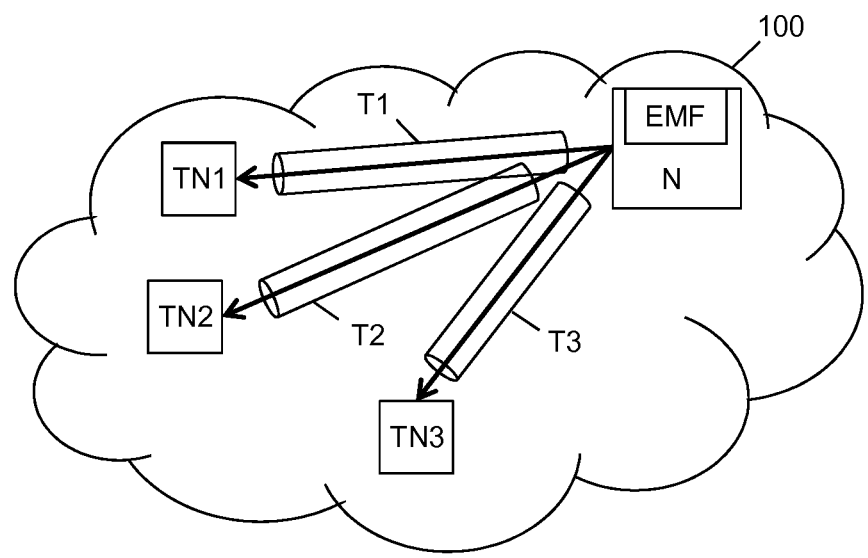
FIG. 7 schematically shows an exemplary application of the device for performing a round-trip performance measurement, according to the second embodiment of the present invention in a multipoint scenario.

For example, FIG. 7 schematically shows a point-to-multipoint scenario, wherein a node N of the packet-switched communication network 100 is provided with an embedded measurement function EMF configured to set up three tunnels T1, T2, T3 towards three different target nodes TN1, TN2, TN3 of the network 100. The tunnels T1, T2, T3 are preferably set up using a same tunnelling technique (e.g. GRE or MPLS over IP). Each tunnel T1, T2, T3 is used by the embedded measurement function EMF for transmission of a respective flow of test packets. In case of IP, for all the test packets, the destination address in their headers H is addr(MD), while the source addresses depend on the tunnel used (namely, addr(TN1) for test packets transmitted within the tunnel T1, addr(TN2) for test packets transmitted within the tunnel T2 and addr(TN3) for test packets transmitted within the tunnel T3). Each target node TN1, TN2, TN3 preferably behaves similarly to the target node TN described above, namely it receives the test packets from the respective tunnel TN1, TN2, TN3, extracts the test packets therefrom and sends the extracted test packets back to the embedded measurement function EMF of the node N. The embedded measurement function EMF distinguishes the test packets coming from each target node TN1, TN2, TN3 based on proper information carried in the test packet (either in the header H, such as the source address SA, or in the payload PL). This way, the measurement device MD provides separate transmission and reception parameters for each flow of test packets and uses them to provide separate round-trip performance measurements for each pair of nodes N-TN1, N-TN2 and N-TN3.

If the network 100 supports a multicast service, the test packets may be replicated by the network 100 itself. This leads to an easier configuration on the measurement device MD (the configuration of one dedicated tunnel for each target node is not needed) and less generation burden. However, this techniques may only provide aggregated performance measurements for all the target nodes TN1, TN2, TN3.

A multipoint-to-multipoint scenario could also be envisaged, where a set of nodes of the communication network 100 reciprocally interconnected are provided with respective embedded measurement functions so that each node originates multiple tunnels terminating at the other nodes, so as to create a partially or fully meshed topology of tunnels. Each tunnel is then used for the transmission of a respective flow of test packets as described above.

According to a third embodiment of the present invention, the measurement device MD does not implement any tunnelling technique and instead exploits the tunnelling capabilities of the nodes of the communication network 100.

Figure 8:
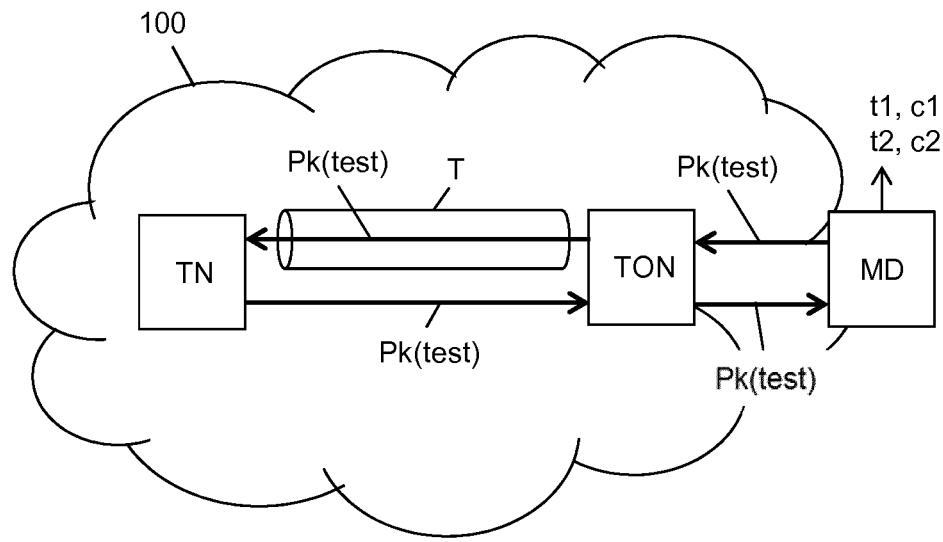
FIG. 8 schematically shows a packet-switched communication network comprising a device for performing a round-trip performance measurement, according to a third embodiment of the present invention.

In particular, as schematically depicted in FIG. 8, according to the third embodiment the measurement device MD is bidirectionally connected to a first node TON of the network 100 adjacent thereto, also termed herein after "tunnel originating node", which is in turn connected to a target node TN of the network 100.

Figure 9:
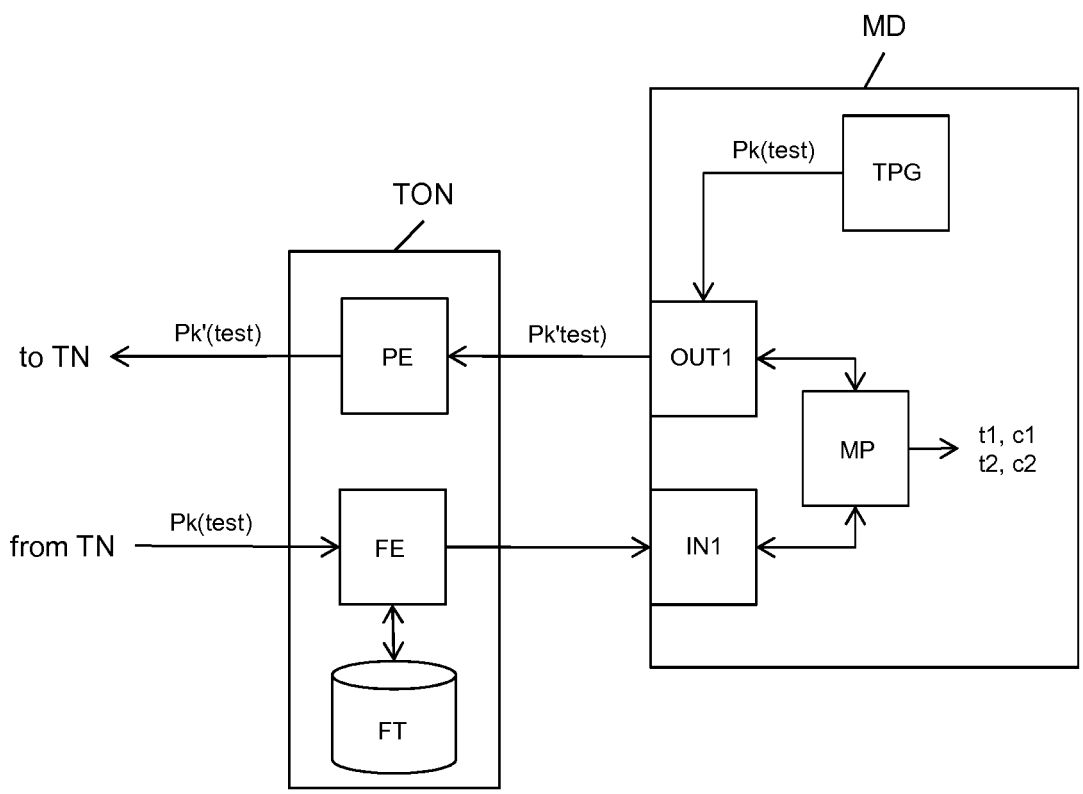
FIG. 9 shows in further detail the structure of the measurement device and the tunnel originating node of FIG. 8.

As shown in FIG. 9, according to the third embodiment the measurement device MD does not comprise any packet encapsulator, namely the test packet generator TPG is directly connected to the output interface OUT1 of the device. The tunnel originating node TON comprises a packet encapsulator PE configured to implement a tunnelling technique and a forwarding engine FE and a forwarding table FT for implementing the network protocol supported by the network 100. The measurement device MD is bidirectionally connected to the tunnel originating node TON by means of the input interface IN1 and output interface OUT1. The structure of the target node TN is similar to that shown in FIG. 3.

According to the third embodiment, in order to start a round-trip performance measurement session, at the measurement device MD the test packet generator TPG preferably starts generating a flow of test packets Pk(test) formatted according to the network protocol supported by the network 100. Hence, in the considered exemplary case of IP as network protocol, the header H of each test packet Pk(test) comprises address of the measurement device addr (MD).

Then, according to the third embodiment, the test packets Pk(test) are transmitted from the measurement device MD to the tunnel originating node TON via the output interface OUT1.

According to the third embodiment, while the test packets Pk(test) are transmitted by the measurement device MD, the measurement point MP preferably generates at least one transmission parameter relating to the test packets Pk(test) as transmitted by the output interface OUT1. In particular, the measurement point MP may provide a transmission counter $c_1$ counting the number of test packets Pk(test) which has been transmitted since the beginning of the performance measurement session and/or a transmission timestamp MO for each transmitted test packet Pk(test). As described above, the values of the transmission parameters may be either locally stored in a local memory of the measurement device MD (possibly with respective test packet identifiers), or they may be inserted in the test packets Pk(test) themselves.

Then, according to the third embodiment, at the tunnel originating node TON, the packet encapsulator PE is preferably configured with rule that causes the test packets Pk(test) be identified and forwarded along a tunnel T, which originates at TON and is terminated at the target node TN. As an example, the rule may include one or a combination of the following clauses:

the logical ingress logical interface (e.g. identified by the physical Ethernet port and the VLAN ID);
the IP destination address DA;
the UDP destination port.

For implementing this rule, the packet encapsulator PE of the tunnel originating node TON preferably encapsulates the test packets Pk(test) in corresponding encapsulated test packets Pk'(test) by prefixing to each test packet Pk(test) a respective tunnel header TH, as described above.

For instance, if the network 100 is an IP/MPLS network (namely, the test packets Pk(test) are IP packets), the tunnel T may be implemented by using a MP-BGP (Border Gateway Protocol)/MPLS IP VPN (Virtual Private Network) as described by the RFC 4364 of February 2006.

According to the third embodiment, the measurement device MD preferably acts as a CE (customer edge) router, while the tunnel originating node TON and the target node TN act as PE (provider edge) routers. This advantageously allows exploiting the the BGP functionalities and the VFR table already present within the nodes of the network 100, thereby avoiding the implementation of such functionalities within the measurement device MD.

In this case, the tunnel header TH comprises a virtual private network label VPN-L and a delivery header DH external to the virtual private network label VPN-L. The virtual private network label VPN-L preferably is an MPLS label assigned by the target node TN and distributed by use of MP-BGP to the tunnel originating node TON.

Figure 5C:
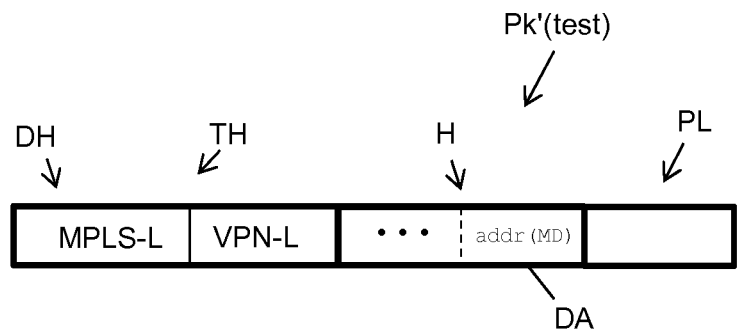

The delivery header DH may be any protocol header that the network 100 supports and causes the packet to be delivered to the target node TN. As an example, the delivery header DH may be another MPLS label MPLS-L that, in the network 100 supporting IP/MPLS, designates the LSP (label switched path) terminated by the target node TN, as schematically depicted in FIG. 5c.

This way, the encapsulated test packets Pk'(test) are advantageously forwarded by exploiting the same forwarding functionality (namely, in the example above, the IP/MPLS routing) supported by the nodes of the network 100 for forwarding the packets Pk, with no need to implement any additional packet forwarding mechanism. If the delivery header DH is an IP header, the tunnel header TH may also comprise a GRE header (not shown in FIG. 5c) interposed between the MPLS label MPLS-L and the delivery header DH, so as to implement an MPLS in IP-GRE tunnelling technique.

The encapsulated test packets Pk'(test) are then received at the target node TN, which terminates the tunnel T by extracting each test packet Pk(test) from the respective encapsulated test packet Pk'(test) and then normally processes the test packets Pk(test) based on the packet forwarding information comprised in their header H—in particular based on the value of their destination address field DA, in case of IP—according to the forwarding functionality of the network protocol supported by the packet-switched network 100. In case of IP, since the value of their destination address field DA is the address of the measurement device addr (MD), the test packets Pk(test) are accordingly sent back to the measurement device MD. The node TON acts as an intermediate node receiving the test packets Pk(test) from the target node TN and forwarding them to the measurement device MD by means of its forwarding engine FE and forwarding table FT.

The test packets Pk(test) are then received at the measurement device MD, in particular at the input interface IN1.

According to the third embodiment, while the test packets Pk(test) are received by the measurement device MD, the measurement point MP preferably generates at least one reception parameter relating to the test packets Pk(test) as received by the input interface IN1. In particular, the measurement point MP may provide a reception counter $c_2$ counting the number of test packets Pk(test) which has been received since the beginning of the performance measurement session and/or a reception timestamp $t_2(j)$ for each received test packet Pk(test). As described above, the values of the reception parameters may be locally stored in a local memory of the measurement device MD (possibly with respective test packet identifiers).

The measurement point MP then preferably performs round-trip performance measurements based on the at least one transmission parameter relating to the test packets Pk(test) as transmitted by the output interface OUT1 and the at least one reception parameter relating to the test packets Pk(test) as received by the input interface IN1.

According to a fourth embodiment of the present invention, neither the measurement device MD nor the target node TN implement any tunnelling technique and instead they both exploit the tunnelling capabilities of the nodes of the communication network 100.

Figure 10:
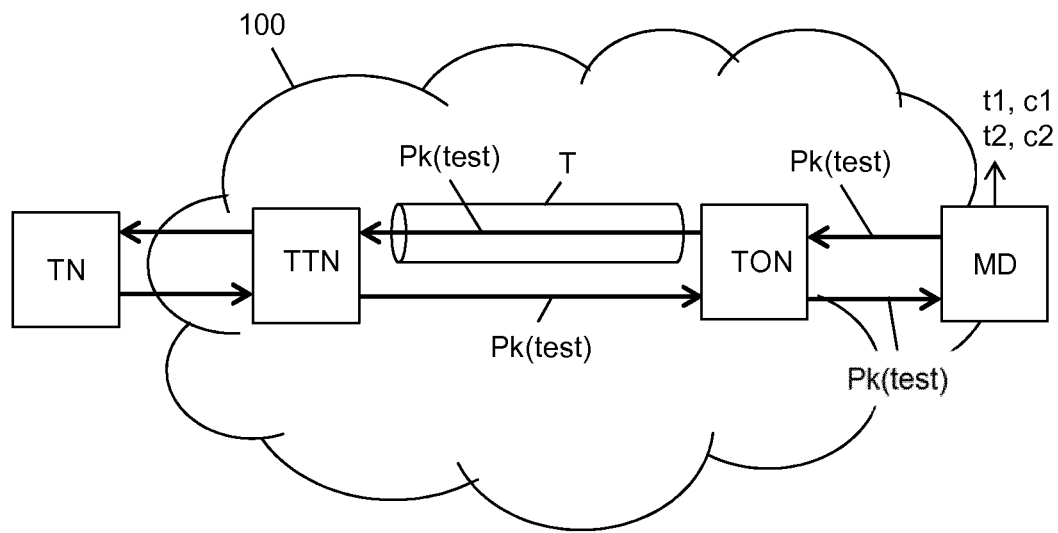
FIG. 10 schematically shows a packet-switched communication network implementing the method for performing a round-trip performance measurement, according to a fourth embodiment of the present invention.

Hence, as shown in FIG. 10, similarly to the third embodiment, the measurement device MD is connected to a tunnel originating node TON performing the encapsulation of the test packets Pk(test). However, differently from the previous embodiments, the target node which shall send back the test packets Pk(test) after they have been extracted from the tunnel T is not the node terminating the tunnel T, but it is a node adjacent thereto. In particular, according to the fourth embodiment, the tunnel T is terminated at a node TTN of the network 100, also termed herein after "tunnel terminating node", which precedes the target node TN by one hop.

The structure of the measurement device MD and tunnel originating node TON are similar to those shown in FIG. 9.

Figure 11:
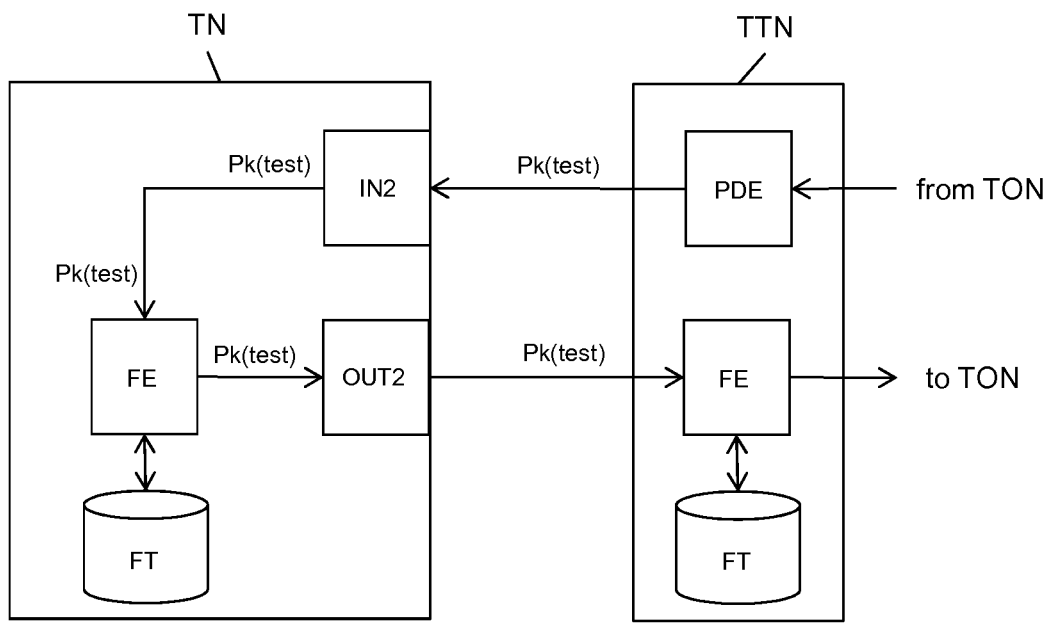
FIG. 11 shows in further detail the structure of the tunnel terminating node and target node of FIG. 10.

Further, as shown in FIG. 11, according to the fourth embodiment the target node TN does not comprise any packet de-encapsulator, namely the input interface IN2 is directly connected to the forwarding engine FE within the target node TN. The tunnel terminating node TTN instead comprises a packet de-encapsulator PDE configured to terminate the tunnel T by extracting the test packets Pk(test) therefrom. The tunnel terminating node TTN also comprises a forwarding engine FE and a forwarding table FT for implementing the network protocol supported by the network 100. The target node TN is bidirectionally connected to the tunnel terminating node TTN by means of the input interface IN2 and output interface OUT2.

Also according to the fourth embodiment, the test packets Pk(test) generated by the measurement device MD have in their header H packet forwarding information suitable for making the test packets being forwarded to the measurement device MD (namely, in case of IP as network protocol, they have the IP address addr(MD) of the measurement device MD as destination address). The packet encapsulator PE is preferably configured with a rule that causes the test packets Pk(test) be identified and forwarded along a tunnel T, which originates at the node TON and is terminated at the node TTN. As an example, the rule may include one or a combination of the following clauses:

the logical ingress logical interface (e.g. identified by the physical Ethernet port and the VLAN ID);
the IP destination address DA;
the UDP destination port.

For implementing this rule, the packet encapsulator PE of the tunnel originating node TON preferably encapsulates the test packets Pk(test) in corresponding encapsulated test packets Pk'(test) by prefixing to each test packet Pk(test) a respective tunnel header TH, as described above.

For instance, if the tunnel T is implemented by using a BGP (Border Gateway Protocol)/MPLS IP VPN (Virtual Private Network) as described above, the tunnel header TH may comprise a virtual private network label VPN-L and a delivery header DH external to the virtual private network label VPN-L, wherein both the virtual private network label VPN-L and the delivery header DH may include respective MPLS labels. This way, the nodes TON and TTN act as PE routers, whereas the measurement device MD and the target node TN act as CE routers.

The encapsulated test packets Pk'(test) are then received at the tunnel terminating node TTN, which terminates the tunnel T by extracting each test packet Pk(test) from the respective encapsulated test packet Pk'(test). According to the fourth embodiment, the tunnel terminating node TTN is preferably pre-configured with a rule—overruling the default forwarding criteria of the forwarding engine FE and forwarding table FT of the node TTN—according to which transmission of packets extracted from the tunnel T and having their destination address equal to addr(MD) (namely, the test packets Pk(test)) shall be forced to the target node TN. Such rule may be provided as a static route or a route distributed via BGP. Alternatively, the rule may be a PBR (Policy Based Routing) rule.

The target node TN receives the test packets Pk(test) from the node TTN and then normally processes them based on the information comprised in their header H—in particular based on the value of their destination address field DA—according to the forwarding functionality of the network protocol supported by the packet-switched network 100. Since the value of their destination address field DA is the address of the measurement device addr(MD), the test packets Pk(test) are accordingly sent back to the measurement device MD. The nodes TTN and TON act as intermediate nodes receiving the test packets Pk(test) from the target node TN and forwarding them to the measurement device MD by means of their forwarding engines FE and forwarding tables FT.

According to a variant of the fourth embodiment not shown in the drawings, the test packets Pk(test) may be sent back from the tunnel terminating node TTN to the tunnel originating node TON within a virtual private network. The virtual private network used at this purpose may be the same used for transmission of the encapsulated test packets Pk'(test) from the node TON to the node TTN. _The virtual private network used may be a customer private network set up amongst a number of nodes including TON and TTN.

The invention claimed is:

1. A method for performing a round-trip performance measurement in a packet-switched communication network supporting a network protocol, said method comprising:
   a) at a measurement device cooperating with said communication network, generating a flow of test packets formatted according to said network protocol and comprising packet forwarding information suitable for inducing said communication network to forward said test packets to said measurement device
   b) transmitting said test packets within a tunnel set up in said communication network and, while said test packets are transmitted, generating, at said measurement device, at least one transmission parameter;
   c) after said test packets have been extracted from said tunnel, forwarding back said test packets to said measurement device based on said packet forwarding information and, while said test packets extracted from said tunnel are received at said measurement device, generating, at said measurement device, at least one reception parameter; and
   d) performing, at said measurement device, said round-trip performance measurement based on said at least one transmission parameter and said at least one reception parameter, wherein
   step b) includes transmitting said test packets from said measurement device to a first node of said packet-switched communication network,
   said first node is adjacent to and distinct from said measurement device,
   said tunnel is originated at said first node,
   at step b) said tunnel is terminated at a second node of said communication network,
   said second node:
      extracts said test packets from said tunnel, and
      based on a rule overruling default forwarding criteria of said second node,
   forces transmission of said test packets to a target node of said communication network,
   said target node is adjacent to and distinct from said second node, and
   said target node, which is adjacent to said second node, forwards back said test packets to said measurement device based on said packet forwarding information.

2. The method according to claim 1, wherein said packet forwarding information is comprised in a header of each test packet.

3. The method according to claim 2, wherein said packet forwarding information comprises an address of said measurement device, said address being written by said measurement device in a destination address field of the header of each generated test packet.

4. The method according to claim 1, wherein said step b) comprises:
   at the ingress of said tunnel, inserting each test packet in said tunnel by prefixing a tunnel header thereto; and
   at the exit of said tunnel, extracting each test packet from said tunnel by removing said tunnel header therefrom.

5. The method according to claim 1, wherein step b) comprises, at said first node, identifying said test packets received from said measurement device and inserting said test packets within said tunnel, said test packets being identified based on one or more of the following information:
   an identifier of a logical ingress or a logical interface through which said test packets are received at said first node;
   a destination address of said test packets; and
   a destination port of said test packets.

6. The method according to claim 1, wherein at step b) said target node forwards said test packets back to said measurement device based on said packet forwarding information comprised in said test packets, by using a forwarding engine and forwarding table comprised in said target node.

7. The method according to claim 1, wherein step b) comprises locally storing at said measurement device said at least one transmission parameter.

8. The method according to claim 1, wherein:
step b) comprises inserting values of said at least one transmission parameter in said test packets, before they are transmitted within said tunnel; and
step c) comprises extracting said values of said at least one transmission parameter from said test packets extracted from said tunnel and received at said measurement device.

9. The method according to claim 1, wherein:
at step b), said at least one transmission parameter further comprises a transmission counter to count a number of test packets transmitted by said measurement device; and
at step c), said at least one reception parameter comprises a reception counter counting a number of test packets received by said measurement device and/or, for each received test packet, a respective reception timestamp indicating a time at which said test packet has been received by said measurement device.

10. The method according to claim 1, wherein said measurement device is a measurement function embedded within a node of said communication network.

11. The method according to claim 1, wherein the test packets are generated at a rate corresponding to a desired measurement precision.

12. The method according to claim 1, wherein the network protocol is IP (Internet Protocol) and said tunnel is implemented as a virtual private network.

13. The method according to claim 1, wherein each test packet includes a test packet identifier in a payload section thereof.

14. The method according to claim 13, wherein the at least one transmission parameter includes, for each transmitted test packet, a respective transmission timestamp indicating a time at which said test packet has been transmitted by said measurement device.

15. The method according to claim 14, further comprising storing, at the measurement device, at least one of:
each transmission timestamp corresponding to a test packet in association with the test packet identifier corresponding to the test packet, or
an ordered sequence of transmission timestamps.

16. The method according to claim 1, wherein each test packet includes a plurality of padding bits to reach a desired test packet size.

17. A system comprising:
a measurement device for performing a round-trip performance measurement in a packet-switched communication network supporting a network protocol, said measurement device comprising at least one processor configured to implement:
a test packet generator configured to generate a flow of test packets formatted according to said network protocol and comprising packet forwarding information suitable for inducing said communication network to forward said test packets to said measurement device;
a first node comprising at least one processor configured to implement:
a packet encapsulator configured to implement a tunnel in said communication network and transmit said test packets within the tunnel; and
a second node comprising at least one processor configured to implement:
a packet de-encapsulator PDE configured to terminate the tunnel by extracting said test packets from the tunnel, wherein
the at least one processor of the measurement device is further configured to implement:
a measurement point configured to:
while said test packets are transmitted from said measurement device, generate at least one transmission parameter;
while said test packets extracted from said tunnel and forwarded back to said measurement device based on said packet forwarding information received at said measurement device, generate at least one reception parameter; and
perform said round-trip performance measurement based on said at least one transmission parameter and said at least one reception parameter,
said first node that implements, via said packet encapsulator, said tunnel is adjacent to and distinct from said measurement device,
said second node, based on a rule overruling default forwarding criteria of said second node, forces transmission of said test packets to a target node of said communication network,
said target node is adjacent to and distinct from said second node, and
said target node, which is adjacent to said second node, forwards back said test packets to said measurement device based on said packet forwarding information.

18. The measurement device according to claim 17, wherein the network protocol is IP (Internet Protocol) and said tunnel is implemented as a virtual private network.

* * * * *